(12) United States Patent (10) Patent No.: US 8,731,568 B1
Epstein et al. (45) Date of Patent: May 20, 2014

(54) DEVICE FOR MANAGING COEXISTENCE COMMUNICATION USING AN INTERFERENCE MEDIATION STRATEGY

(75) Inventors: Bracha Epstein, Beit Shemesh (IL); Yaron Ben-Arie, Hod-Hasharon (IL)

(73) Assignee: Marvell International Ltd., Hamilton (BM)

( * ) Notice: Subject to any disclaimer, the term of this patent is extended or adjusted under 35 U.S.C. 154(b) by 1182 days.

(21) Appl. No.: 12/240,488

(22) Filed: Sep. 29, 2008

Related U.S. Application Data

(60) Provisional application No. 60/975,591, filed on Sep. 27, 2007.

(51) Int. Cl.
*H04W 40/00* (2009.01)
(52) U.S. Cl.
USPC ........ 455/448; 455/63.1; 455/67.13; 370/208
(58) Field of Classification Search
USPC .............................................. 455/67.13, 63.1
See application file for complete search history.

(56) References Cited

U.S. PATENT DOCUMENTS

| | | | | |
|---|---|---|---|---|
| 7,146,133 | B2 * | 12/2006 | Bahl et al. | 455/63.1 |
| 2002/0155811 | A1 * | 10/2002 | Prismantas et al. | 455/63 |
| 2005/0281189 | A1 * | 12/2005 | Lee et al. | 370/208 |
| 2006/0121853 | A1 * | 6/2006 | Madhavan et al. | 455/63.1 |

OTHER PUBLICATIONS

U.S. Appl. No. 12/235,169, filed Sep. 22, 2008, in the name of Epstein.
U.S. Appl. No. 12/235,418, filed Sep. 22, 2008, in the name of Epstein.

* cited by examiner

*Primary Examiner* — Dwayne Bost
*Assistant Examiner* — Gerald Johnson

(57) ABSTRACT

Aspects of the disclosure provide a device for managing wireless communication. The device can include an interface module coupled to at least a first wireless device. The first wireless device can communicate with a second wireless device using a first radio frequency (RF) signal that potentially interferes at least a second RF signal communicating between a third wireless device and a fourth wireless device. Further, the device can include a coexistence communication manager (CCM) configured to instruct at least the first wireless device to change at least the first RF signal according to an interference mitigation strategy that is determined based on status profiles of at least the first wireless device when the first RF signal interferes with at least the second RF signal.

35 Claims, 5 Drawing Sheets

DEVICE FOR MANAGING COEXISTENCE COMMUNICATION USING AN INTERFERENCE MEDIATION STRATEGY

INCORPORATION BY REFERENCE

This application claims the benefit of U.S. Provisional Application No. 60/975,591, "Coexistence Communication Coordinator for Multi-Comm Devices" filed on Sep. 27, 2007, including all cited references, which is incorporated herein by reference in its entirety.

BACKGROUND

Wireless devices, such as cell phones, Bluetooth (BT) devices, and the like, may operate in a same radio frequency (RF) environment and result in coexistence interference. For example, a GSM cell phone operating at 850 MHz may generate a third harmonic at 2.55 GHz. The third harmonic may interfere with a WiFi device operating at about 2.4 GHz, in a close proximity. Additionally, occurrences of coexistence interference may depend on parameters of the wireless devices. For example, a WiFi device operating in a "G" band may interfere with a global positioning system (GPS) device, while the WiFi device operating in a "A" band may not interfere with the GPS device.

SUMMARY

A coexistence communication manager (CCM) may be described as a broker or arbitrator for sharing radio frequency (RF) resources, such as the RF spectrum, time-slots, code division multiple access (CDMA) codes, frequency hopping (FH) codes, or other RF resources that are used by multiple wireless devices. The CCM can command wireless devices to de-conflict their use of RF resources, i.e., the CCM can mitigate coexistence interference. The CCM may apply interference mitigation policies, both with real-time (RT) and/or non-real-time (NRT) procedures and modules, that coordinate wireless device transmissions that would otherwise interfere. For example, the CCM may direct a Bluetooth (BT) wireless device to operate in a mode that reduces interference to a GSM cell phone.

An RT processor or module within the CCM can direct time-sensitive operations, such as a feedback loop that tells hardware within the wireless device how to track RF received power, track the time of arrival (TOA) of packets, transmit a packet at a precisely determined time with respect to other packets, and the like. The RT processor may operate on short time scales, such as a packet interval, a microsecond time scale, and the like.

A NRT module can command the RT module to perform an interference mitigation procedure that directs hardware operation in a wireless device. For example, the NRT can initiate changing an RF parameter of a wireless device, such as a channel, a transmission frequency, a transmission time, a transmission power, and the like, such as disclosed in Applicant's copending U.S. patent application Ser. No. 12/235,169, filed on Sep. 22, 2008 and Ser. No. 12/235,418, filed on Sep. 22, 2008, which are incorporated herein by reference in their entirety. In addition, the NRT can initiate downloading suitable software, downloading suitable look-up tables, and the like, to the RT module. The RT module can, for example, interleave the package transmissions between multiple wireless devices, raise and lower power levels of wireless on a microsecond (μS) time scale, turn transceivers on or off, and the like.

The CCM can provide a platform-based solution applying interference mitigation strategies for refereeing or brokering the concurrent use of a RF environment by multiple wireless devices. The CCM can provide a uniform structure and set of procedures for wireless devices to report their susceptibility to interference and their potential to cause interference in the RF environment. The CCM can provide a common interference management function to multiple wireless devices by eliminating or reducing the communications between the pairs of devices. In other words, the CCM can act as a broker that accepts input from wireless devices, such as a mode change when a device is turned on or off, a change in the wireless device service that is in use by a given wireless device, and the like. For example, a GSM cell phone may change from one type of telecommunications service to another when a call is received. The GSM cell phone may report the change in service to the CCM. Based on the change in operating mode of the GSM, the CCM may apply an interference mitigation policy that reallocates RF resources or alters an interference mitigation strategy for other wireless devices. For example, if a cellular telephone that operates at 1.8 GHz is turned off, then a WiFi device may be allowed to operate in A band. Likewise, if a GPS is turned off, a WiFi may be allowed to operate in a G band. However, if 1.8 GHz is on, then the WiFi device may be prohibited from operating in A band. Likewise, if a GPS is active, then the WiFi device may be prohibited from operating in the G band. Moreover, if a GSM phone enters a space, in which a WiFi device is operating in the A band, a request may be made to mitigate the GSM communications to non interleaving channels.

The NRT module can implement a series of actions, such as rule-based actions that process interference profiles from wireless devices, apply logic and policies to select and implement mitigation strategies, and monitor compliance and effectiveness of the implemented mitigation strategies. The NRT module may be part of an application processor or a communication processor. In one example, the NRT can be part of an application processor and the RT module can be part of a communications processor. In another example, the NRT module may be a distributed unit that communicates with RT modules located within each wireless device. In yet another example, both the RT and NRT modules of the CCM can be a distributed device. For example, the CCM may be an interlinked set of processors, a neural network, a systolic array, and the like.

A GSM cell phone operating at channel A of an 850 MHz band can interfere with a WiFi access point (AP) operating on channel 11. The WiFi AP may transmit intermittently and may indicate a change of operational state for upcoming transmissions. The WiFi AP can send status information to the NRT module of the CCM. In this example, the GSM cell phone can send status information to the NRT module of the CCM, which can record the state of each wireless device, identify problematic combinations of wireless devices that need mitigation. The NRT module may then dispatch instructions, software, and the like to the RT module to de-conflict the use of common RF resources. It may be noted that the CCM acts as a hierarchical controller for communications management when the communications can cause interference to one of two or more wireless devices. It may be noted that the CCM can provide mitigation services to two or more devices, whether the two or more devices are on the same platform or on different platforms. The CCM can be independent of various communications protocols, such as stack protocols, can be independent of the chip architecture, such as a specific communications processor, can be independent of the types of RF modems, or wireless device structure and can be independent of other communications decisions.

The NRT module of the CCM can be device independent. For example, the NRT module may receive coexistence profiles from each wireless device that indicate the susceptibility to interference, the types of potential interferers, the strength or propensity to cause interference, and other interference mitigation parameters. The NRT module can take non-real-time inputs from each wireless device in a platform or on external platforms, can determine which of the multiple wireless devices may experience coexistence interference problems, and can instruct the wireless devices how to de-conflict use of the commonly RF spectrum. For example, the NRT module can change the mode of RF transmission of a given wireless device. The RT module can operate on a short time scale, such as negotiating times that two packet-based transmitters may be allowed to emit an RF signal.

The present disclosure can provide a device for managing wireless communication. The device can include an interface module coupled to at least a first wireless device. The first wireless device can communicate with a second wireless device using a first radio frequency (RF) signal that potentially interferes at least a second RF signal communicating between a third wireless device and a fourth wireless device. Further, the device can include a coexistence communication manager (CCM) configured to instruct at least the first wireless device to change at least the first RF signal according to an interference mitigation strategy that is determined based on status profiles of at least the first wireless device when the first RF signal interferes with at least the second RF signal.

Additionally, the CCM can include a non-real-time module configured to instruct at least the first wireless device to change at least one of a transmit power, a channel, a frequency, an orthogonal frequency division multiple access (OFDMA) time-frequency allocation, a code division multiple access (CDMA) code, a frequency hop (FH) code, a symbol rate, an RF signal phase, and an RF polarization in a non-real-time manner, such as disclosed in Applicant's copending U.S. patent application Ser. No. 12/235,169, filed on Sep. 22, 2008 and Ser. No. 12/235,418, filed on Sep. 22, 2008, which are incorporated herein by reference in their entirety. Further, the CCM may include a real-time (RT) module configured to arbitrate at least the first wireless device in real time so that the first RF signal is transmitted at a different time than the second RF signal.

The present disclosure provides for a manager for wireless communication that can include a transceiver that transmits and receives RF signals in an RF environment that is in responsible of transmission of multiple wireless devices and a CCM that communicates with the wireless devices and instructs a wireless device to change the frequency of transmission, the length of a burst of RF transmission, the starting times of a transmission burst, the code-division multiple access (CDMA) code, the modulation format, the RF polarization, the symbol rate, or the RF signal phase of the RF signal between a pair of wireless devices when the CCM determines that the RF signal causes coexistence interference with another RF signal between another pair of wireless devices. The CCM can also include a non-real-time (NRT) module, that selects an NRT transmission policy that the CCM uses to mitigate coexistence interference among the multiple wireless devices, and a real-time (RT) coordinator module that arbitrates a wireless device from each pair of devices so that the RF signals are transmitted at a different time.

The present disclosure can provide for a manager for wireless communication that can include a transceiver that transmits and receives radio frequency (RF) signals in a radio frequency environment that is responsible for transmissions for multiple wireless devices and a CCM. The CCM can communicate with the wireless devices over a wired interface or a wireless interface and can instruct a wireless device to change an RF signal parameter when the RF signal causes coexistence interference with another RF signal that is transmitted by another wireless device. The CCM can include a non-real-time (NRT) module that selects an NRT transmission policy that the CCM uses to mitigate coexistence interference between multiple wireless devices.

The present disclosure allows for a method to reduce interference in wireless devices that operate in an RF environment. The method can include detecting the status of an interference-susceptible wireless device, for example by scanning the RF environment, or information from higher levels of communication, such as referring a look-up-table storing prior known types of transmission and coexistence issue, calculating a measure of the potential for interference based on RF signal parameters of an RF signal from a coexistence interference managed wireless device and the status of the interference-susceptible wireless device, and changing the interference-mitigating parameter to reduce the interference-potential metric.

The present disclosure can provide a method for managing coexistence communication. The method can include determining an interference mitigation strategy based on status profiles of at least a first wireless device. The first wireless device can communicate with a second wireless device using a first radio frequency (RF) signal that potentially interferes with at least a second RF signal communicating between a third wireless device and a fourth wireless device. Further, the method can include instructing at least one of the first wireless device and the second wireless device according to the interference mitigation strategy to change at least the first RF signal in order to mitigate the interference of the first RE signal and at least the second RE signal.

According to an aspect of the disclosure, the interference mitigation strategy can include at least a non-real-time change in at least one of a transmit power, a channel, a frequency, an orthogonal frequency division multiple access (OFDMA) time-frequency allocation, a code division multiple access (CDMA) code, a frequency hop (FH) code, a symbol rate, an RF signal phase, and an RF polarization, such as disclosed in Applicant's copending U.S. patent application Ser. No. 12/235,169, filed on Sep. 22, 2008 and Ser. No. 12/235,418, filed on Sep. 22, 2008, which are incorporated herein by reference in their entirety.

According to another aspect of the disclosure, the interference mitigation strategy may include a real-time arbitration of at least the first RE signal in order to time-multiplex packet transmissions of the first RF signal and at least the second RF signal.

To determine the interference mitigation strategy, the method can include receiving at least one status profile over a wired interface or wireless interface. In an embodiment, the method can determine the interference mitigation strategy by referring to a look-up-table that stores prior known interference mitigation strategies corresponding to prior known coexistence interference combinations. In another embodiment, the method can determine the interference mitigation strategy by calculating an interference-potential metric based on the status profiles. Additionally, the interference mitigation strategy may be determined to maximize a user experience metric for a user using several wireless devices concurrently. In another embodiment, the interference mitigation strategy may be received from a higher level of communication.

Aspects of the disclosure can also provide a wireless device that can operate in a wireless environment managed by a coexistence communication manager (CCM). The wireless device can include an interface to the CCM. The interface can be configured to provide at least a status profile of its own to the CCM, and receive instructions from the CCM. Further, the wireless device can include a transceiver configured to transmit a first radio frequency (RF) signal over the wireless environment. The wireless environment may transmit at least a second RE signal potentially interfering with the first RF signal. The CCM can instruct the wireless device to change at least one transmission parameter of the first RF signal according to an interference mitigation strategy determined based in part on the status profile of the wireless device in order to mitigate coexistence interference of the first RF signal and at least the second RF signal.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
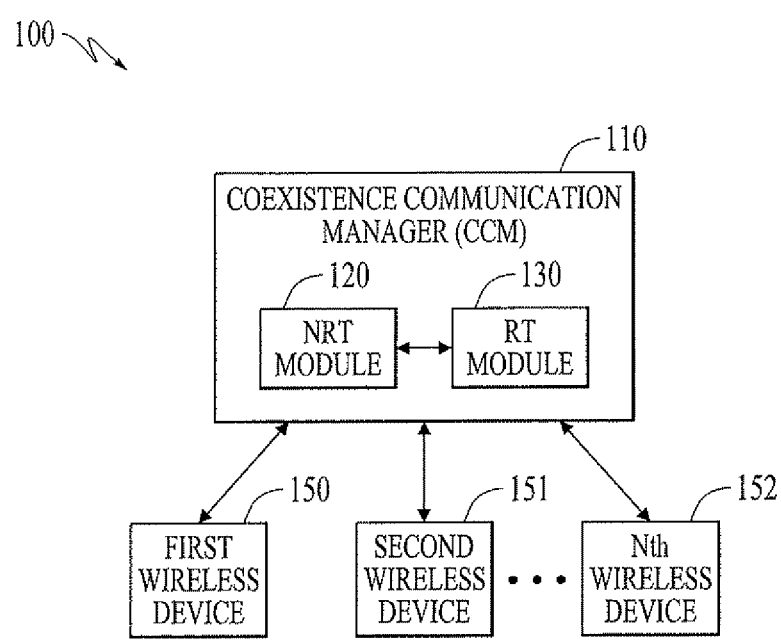
FIG. 1 shows a diagram of a coexistence interference managing configuration example according to an embodiment.

FIG. 1 shows a diagram of a coexistence interference managing configuration example according to an embodiment. The coexistence interference managing configuration 100 may include a coexistence communication manager (CCM) 110, and a plurality of wireless devices 150-152. The CCM 110 can further include a non-real-time (NRT) module 120 and a real-time (RT) module 130. These elements can be coupled together as shown in FIG. 1.

The wireless devices 150-152 can include various cell phones, such as GSM cell phones, CDMA based cell phones, and the like. The wireless devices 150-152 can also include WiFi devices, WiMax devices, Bluetooth (BT) devices, global positioning system (GPS) devices, and the like.

The wireless devices 150-152 can communicate with their pairs in a common RF environment and may communicate with the CCM 110. For example, the wireless device 150 can upload a status profile to the CCM 110. The status profile can inform the CCM 110 of operating parameters, activities and the like, of the wireless device 150. More specifically, the wireless device 150 can alert the CCM 110 of a status change, such as being powered on or off, a change in service, and the like. The change in service can include a change of operational mode, such as a transition from a sleep mode to an idle mode, a transition from an idle mode to an active mode, a change in the type of information being transferred, a change in data or symbol rate, and the like. The status change may direct to interference susceptibility, tendency to cause interference, and the like. According to an aspect of the disclosure, a wireless device of 150-152 may provide its own status profile to the CCM 110, and may not need to include status of other wireless devices. Therefore, communications between the wireless devices may not be required. According to another aspect of the disclosure, a wireless device of 150-152 may provide status profiles other than its own, for example wireless devices located in the same platform with the wireless device, to the CCM 110.

On the other hand, the CCM 110 can instruct the wireless devices 150-152 of changes to mitigate coexistence interference. The changes may include parameter changes, mode changes, service changes, and the like. More specifically, the CCM 110 may specify, for example transmission time, transmission frequency, spreading code, symbol rate, an RF phase, transmission power, and the like, to mitigate coexistence interference, such as disclosed in Applicant's copending U.S. patent application Ser. No. 12/235,169, filed on Sep. 22, 2008 and Ser. No. 12/235,418, filed on Sep. 22, 2008, which are incorporated herein by reference in their entirety.

In an embodiment, the CCM 110 can be located on the same platform as one or more wireless devices 150-152. Optionally, the CCM 110 can be located on a platform that is separated from the wireless devices 150-152. Communication between CCM 110 and the various devices may be over a wired or wireless interface.

The NRT module 120 may receive status profiles from the wireless devices 150-152. The status profiles may enable the NRT module 120 to determine conflict or coexistence interference. For example, the NRT module 120 may include rules or policies that may determine coexistence interference based on the status profiles of the wireless devices 150-152. It is noted that the status profiles can be provided by the wireless devices 150-152, respectively to the NRT module 120 according to an embodiment of the disclosure. Therefore, the coexistence interference can be determined without the need for a wireless device of 150-152 to be aware of other wireless devices.

Additionally, the NRT module 120 may determine coexistence interference for complex situations that may involve two and more than two wireless devices of 150-152. In other words, the NRT module 120 can act as a hierarchical unit or module that referees or brokers the use of commonly RF resources. For example, a platform, such as a cell phone platform that includes a cell phone core transmitter and receiver, a WiFi, a BT, a GPS, and other wireless devices may potentially experience coexistence interference that can occur in pairs, triplets and quadruplets, and the like.

Further, the NRT module 120 may determine strategies to mitigate the coexistence interference. It is noted that it is possible to de-conflict wireless devices by orthogonalizing signal transmissions. For example, turning off all but one pair of wireless communicating devices at a time can eliminate coexistence interference. Such a mitigation strategy may be called time-sharing. Other mitigation strategies may include frequency hopping, code hopping, and the like. The mitigation strategies may be selected from an interference mitigation policy that accounts for the type of wireless devices detected, the activity status of the wireless devices, the number of wireless devices detected, the susceptibility of a wireless device to interference by another wireless device, the strength of tendency of a wireless device to cause interference to another wireless device, and the like. In other words, the interference mitigation policy can set forth contingency plans that a coexistence managed wireless device can adopt to reduce the interference caused to interference-susceptible wireless devices.

The determined mitigation strategy can include a real-time portion and a non-real-time portion. The non-real-time portion may include user behavior set up, such as begin or end operations, mode change, such as change of channels, transmission power adjustment of one or more devices, and the like, such as disclosed in Applicant's copending U.S. patent application Ser. No. 12/235,169, filed on Sep. 22, 2008 and Ser. No. 12/235,418, filed on Sep. 22, 2008, which are incorporated herein by reference in their entirety. The real-time portion may include mechanisms for operating in a particular mode with particular parameters. The non-real-time portion may be executed by the NRT module 120. The real time strategy may be communicated to the RT module 130. Then, the RT module 130 can execute the real-time portion to mitigate coexistence interference. For example, the NRT module 120 may determine a coexistence interference of a WiFi device and a BT device from status profiles of the WiFi device and the BT device. Further, the NRT module 120 may determine that a real-time packet arbitration strategy is appropriate to mitigate coexistence interference. Then, the NRT module 120 may inform the RT module 130 of the real-time packet arbitration strategy. Accordingly, the RT module 130 can be configured. The RT module 130 may coordinate the WiFi device and the BT device at the packet level, for example time multiplexing packet transmission, and the like, to mitigate the coexistence interference according to an embodiment of the disclosure.

It is noted that the NRT module 120 may be implemented as software, such as firmware, according to an aspect of the disclosure. Therefore, the NRT module 120 can include complicate algorithms to handle complex coexistence interference. Additionally, the NRT module 120 can be updated with ease and reduced cost. Alternatively, the NRT module 120 may be implemented as hardware, or combination of software and hardware.

It is also noted that the RT module 130 may be implemented as hardware, for example as a portion of communication hardware. Therefore, the RT module 130 may have improved reaction speed.

During operation, the wireless devices 150-152 may provide status information, such as status updates to the CCM 110. The NRT module 120 in the CCM 110 may determine coexistence interference based on the status updates. Alternatively, the NRT module 120 may determine coexistence interference based on prior knowledge (e.g. stored in memory) or based on scanning. Additionally, the NRT module 120 may determine mitigation strategies based on the determined coexistence interference. When a determined mitigation strategy includes a non-real-time portion, the non-real-time portion can be executed by the NRT module 120. When a determined mitigation strategy includes a real-time portion, the NRT module 120 may communicate the real-time portion to the RT module 130. Thus, the RT module 130 can be configured accordingly to execute the real-time portion.

Figure 2:
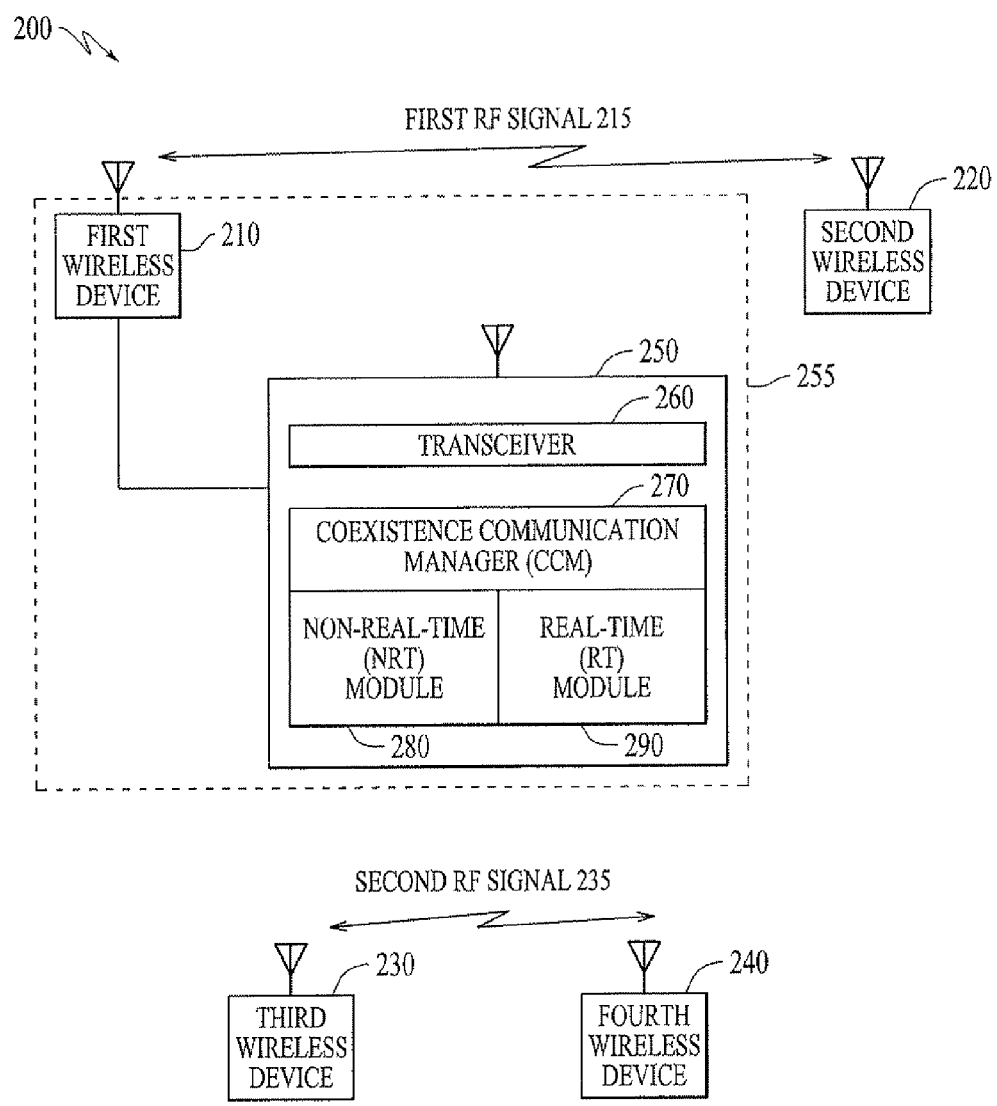
FIG. 2 shows a diagram of a coexistence interference managed environment example in a RF milieu according to an embodiment.

FIG. 2 shows a diagram of a configuration example of a coexistence interference managed environment in an RF milieu according to an embodiment. The configuration 200 can include a wireless coordinator device 250, and a plurality of wireless devices, such as a first wireless device 210, a second wireless device 220, a third wireless device 230, and a fourth wireless device 240 in the RF milieu. It is noted that two pairs of communicating devices are shown for clarity and to illustrate acting principles. More than two pairs of communicating devices can be contemplated.

The first to fourth wireless devices 210-240 can transmit RF signals in the RF milieu. For example, the first wireless device 210 may be a GSM cell phone that transmits at 850 MHz, the second wireless device 220 can be a GSM base station that communicates with the first wireless device 210, which is a GSM cell phone in the example. The third wireless device and the fourth wireless device may be BT devices, WiFi devices, GPS devices and the like, respectively. At a time, the first wireless device 210 may communicate with the second wireless device 220, for example using a first RF signal 215, while the third wireless device 230 may communicate with the fourth wireless device 240, for example using a second RF signal 235. Communication between pairs of devices may or may not have different characteristics/parameters in each direction.

In an embodiment, the wireless coordinator device 250 can include a transceiver 260 and a coexistence communication manager (CCM) 270. The transceiver 260 can be configured to communicate with the first to fourth wireless devices over a wireless interface. The transceiver 260 may receive status profiles of the first to fourth wireless devices 210-240, and may transmit instructions to the first to fourth wireless devices 210-240.

Optionally, the CCM 250 may be located in a same platform with one or more of the wireless devices. As shown in FIG. 2, the CCM 250 can be located in the platform 255 with the first wireless device 210. Additionally, the first wireless device 210 may be coupled to the CCM 250 by a wired interface. Therefore, the CCM 250 may receive the status profile of the first wireless device 210 over the wired interface, and may instruct the first wireless device 210 over the wire interface. Furthermore, the first wireless device 210 and the CCM 250 may be coupled with both the wired interface and/or the wireless interface. Therefore, the two-way communication of the first wireless device 210 and the CCM 250 can be configured using any permutation of the wired interface and the wireless interface.

The CCM 270 can obtain the status profiles of the first to fourth wireless devices 210-240 received from the transceiver 260, and may provide the transceiver 260 with the instructions to the first to fourth wireless devices 210-240.

It is noted that the CCM 270 may communicate with the first to fourth wireless devices via other suitable means. For example, in a common platform configuration, such as the platform 255 in FIG. 2, a wireless device may be included in a platform with the CCM 270. The CCM 270 may communicate with the wireless device, for example via buses. In other words, the first through fourth wireless devices 210-240 and the wireless coordinator device 250 may exist on a common platform or may be distributed, i.e., physically separated.

The CCM 270 can include a non-real-time (NRT) module 280 and a real-time (RT) module 290. The NRT module 280 can execute functions that may not need a real-time scale, such as algorithms for analyzing coexistence interference, determining communication policies, informing mode change of wireless devices, informing the RT module 290 of a real-time configuration, and the like. For example, the NRT module 280 can instruct the RT module 290 to implement a state machine to interleave packets of two packet-based wireless devices that may interference each other.

The RT module 290 can implement communication adjustment strategies in a real-time scale that can execute real-time operations, such as packet operation, of the wireless devices to mitigate or eliminate coexistence interference. For example, the RT module 290 can delay a packet transmission of a first wireless device until a second wireless device completes a packet transmission, or can adjust a packet size and/or spacing between packets, for example.

Figure 3A:
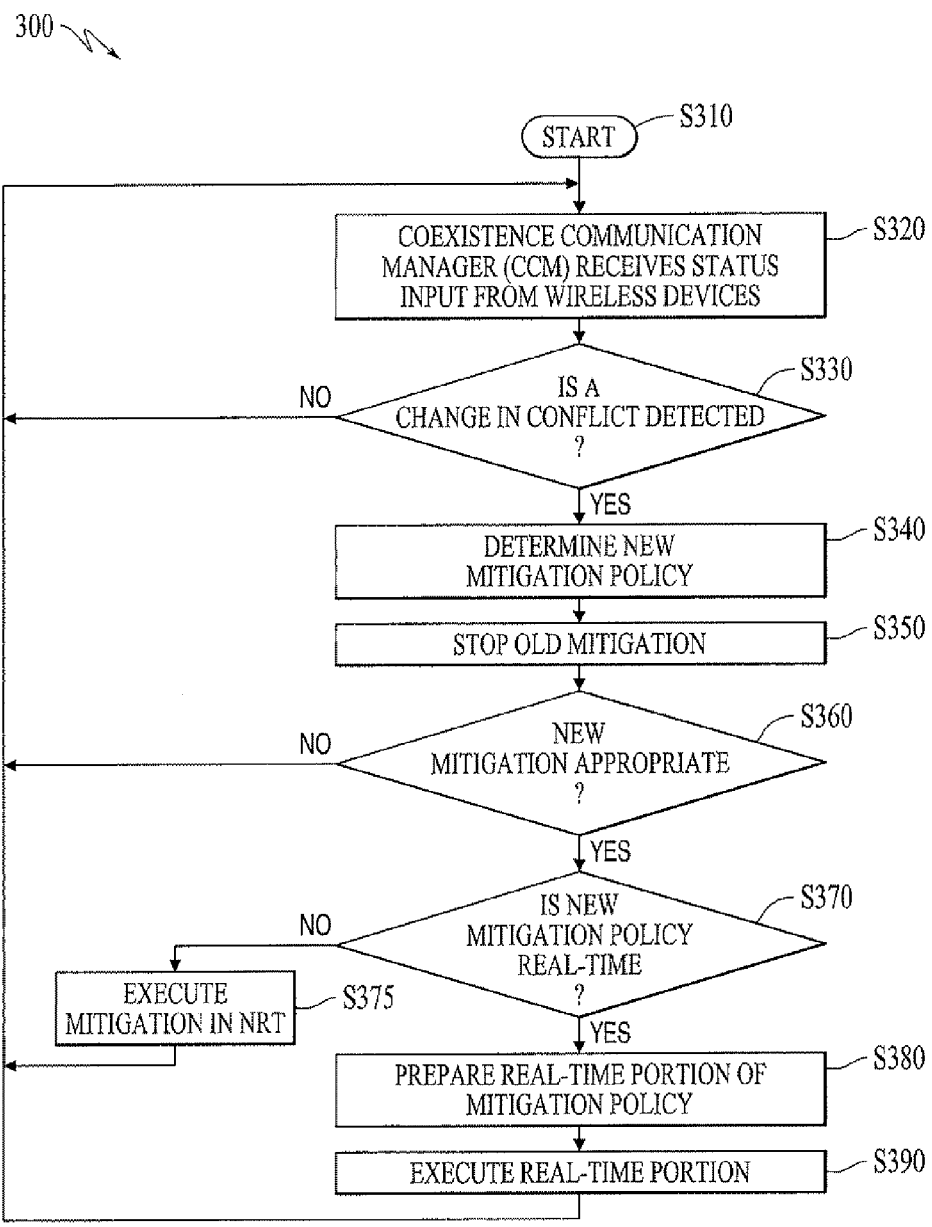
FIG. 3A shows a flowchart of a process example for managing coexistence interference according to an embodiment.

FIG. 3A shows a flowchart of a process example for managing coexistence interference according to an embodiment. The process starts at step S310 and proceeds to step S320. In step S320, a CCM, such as the CCM 270 in FIG. 2, can receive status inputs from wireless devices. For example, the CCM may receive a mode change signal. The mode change signal may be sent by wireless devices in various situations, such as when a wireless device becomes active or prepares to become inactive, when a cell phone receives a call, when an operating frequency is changed, and the like. A mode change in a wireless device may result in a change of coexistence interference. Then, the process proceeds to step S330.

In step S330, the process can determine if a change in conflict pattern or in coexistence interference is detected. For example, when a cell phone turns off, a previously unavailable portion of a spectrum, time slot, code space, and the like, may allow another wireless device to operate in the portion of the RF resources that become available. The change in coexistence interference can be detected by various techniques. In a technique, interfering combinations from prior knowledge may be stored in memory, e.g. in look-up-tables. In another technique, an interference-potential metric can be calculated to quantify the potential for interference of a wireless device on another wireless device. For example, an interference-potential metric, such as a signal-to-interference ratio, a bit error ratio, and the like, may be determined based on status parameters of the wireless devices, such as type of RF communication, activity mode, and the like. If no change in conflict is detected, the process returns to step S320, otherwise process proceeds to step S340.

In step S340, the process can determine a mitigation strategy. In an embodiment, known mitigation strategies corresponding to known interfering combinations can be stored in memory, e.g. in a look-up-table. Therefore, a mitigation strategy corresponding to a detected interfering combination can be determined, e.g. by accessing the look-up-table. For example, a mitigation strategy may no long require packet interleaving to de-conflict two packet-based wireless devices when one of the wireless devices becomes deactivated.

Additionally, the mitigation strategy may be selected to maximize a user experience metric. For example, a mitigation strategy using an interleaving time that is smaller than a threshold may be selected for voice communication in order to avoid voice interruptions. Then, the process proceeds to step S350. In S350, the process can stop an old or obsolete mitigation strategy. In other words, the process may determine that a previously used mitigation strategy is obsolete in the face of the conflict pattern change. Then, the process proceeds to step S360.

In step S360, the process can determine if the newly determined mitigation strategy is appropriate for the new configuration or combination of wireless devices. For example, a wireless device that changes a mode of service may no longer need an older mitigation strategy but a newly developed or selected mitigation strategy may unduly impair performance. If a new mitigation strategy is not appropriate, the process can return to step S320, otherwise process proceeds to step S370.

In step S370, the process can determine if the newly determined mitigation strategy is suitable for non-real-time execution. For example, the CCM may assess the time scale needed to de-conflict coexistence interference between two wireless devices and may determine that a real-time solution is required. If a real-time solution is required, the process proceeds to step S380, otherwise process proceeds to step S375.

In step S380, the process can prepare a real-time portion of a mitigation strategy. For example, the NRT module of the CCM may communicate necessary information, such as look-up table, state machine parameters, and the like, to the RT module, and may instruct the RT module to execute the real-time portion of the mitigation strategy. Then, the process proceeds to step S390.

It is noted that a real-time solution may or may not include a non-real-time portion. When the real-time solution includes a non-real-time portion, the NRT module may operate according to the non-real-time portion, and may also communicate with the RT module, and coordinate the non-real-time portion and the real-time portion. When the real-time solution does not include a non-real-time portion, the NRT module may prepare the RT module, and may wait for the RT module completing the real-time portion of the mitigation strategy.

In step S390, the real-time portion of the mitigation strategy is executed. For example, the RT module within the CCM can execute state machine instructions, perform gate logic functions, and the like. Then, the process return to step S320 where the process can continue managing coexistence communication.

In step S375, the process can execute the non-real-time portion of the mitigation strategy. The non-real-time portion of the mitigation strategy may include change of channels, transmission power adjustment of one or more devices, and the like, such as disclosed in Applicant's copending U.S. patent application Ser. No. 12/235,169, filed on Sep. 22, 2008 and Ser. No. 12/235,418, filed on Sep. 22, 2008, which are incorporated herein by reference in their entirety. For example, the process can inform a first wireless device to an off mode, and wait for a second wireless device to complete a call. Then, the process may reallocate a spectrum used by the second wireless device to the first wireless device, for example. From step S375, the process returns to step S320 to continue managing coexistence communication.

Figure 3B:
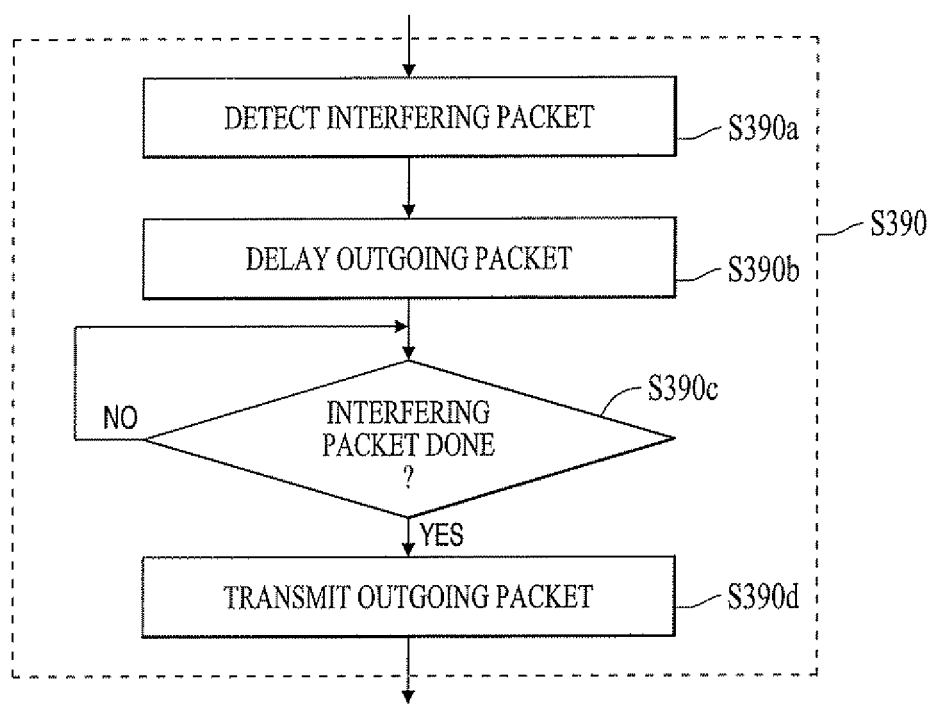
FIG. 3B shows a flowchart of a real-time (RT) portion implementation example according to an embodiment.

FIG. 3B shows a flowchart of a real-time (RT) implementation example of step S390 in FIG. 3A according to an embodiment. The real-time implementation may control packet transmission in real-time to mitigate coexistence interference. The implementation starts at step S390a. In step S390a, the RT module can detect an interfering packet. For example, the RT module may be configured in a packet interleaving configuration to mitigate a coexistence interference between a WiFi device and a cell phone device. The RT module may monitor packet status of the WiFi device and the cell phone device. The WiFi device may send a signal indicating a WiFi packet for sending when the cell phone device may send a signal indicating that the cell phone device is receiving a cell phone packet. Thus, the cell phone packet may be an interfering packet, for example.

From step S390a, the implementation proceeds to step S390b. In step S390b, the RT module may delay a packet transmission that may result in the interfering packet. In the above example, the RT module may instruct the WiFi device to delay sending the WiFi packet. Then, the implementation proceeds to step S390c.

In S390c, the RT module can determine if the detected interfering packet is complete. In the above example, the RT module can monitor the cell phone device for a signal indicting status of the cell phone packet. When the cell phone packet is not fully received, the implementation returns to step S390c, otherwise, the implementation proceeds to step S390d.

In step S390d, the RT module can instruct transmitting the delayed outgoing packet. In the above example, the RT module may instruct the WiFi device to transmit the WiFi packet after the cell phone packet is fully received. Thus, the WiFi packet transmitted by the WiFi device may not interfere the cell phone packet received by the cell phone.

Figure 4:
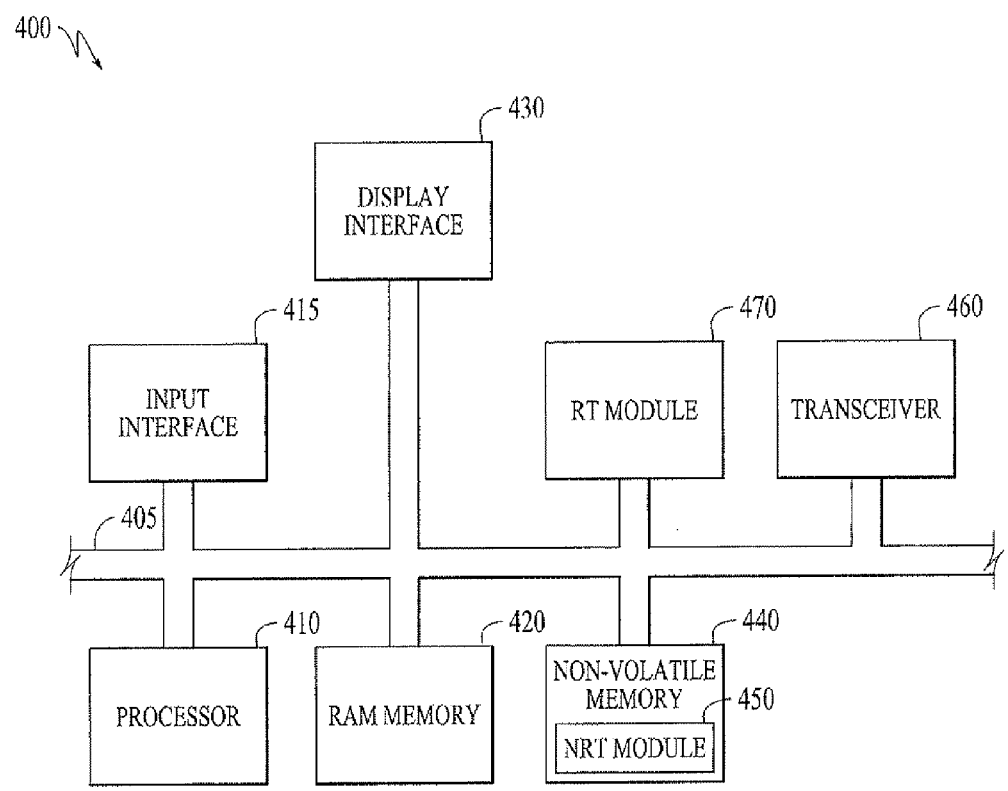
FIG. 4 shows a block diagram of a coexistence communication manager example according to an embodiment.

FIG. 4 shows a block diagram of a coexistence communicator manager (CCM) example 400 according to an embodiment. The CCM 400 can include a processor 410, an input interface 415, a random access memory (RAM) 520, a non-volatile memory 440 that includes an NRT module 450, a display interface 430, a transceiver 460, and an RT module 470. These elements can be coupled together as shown in FIG. 4.

The processor 410 can execute system instructions to maintain the CCM 400. More specifically, the processor 410 may execute an operating system, such as Linux, to maintain the CCM 400. The operating system can perform various system functions, such as memory management, task scheduling, interrupt handling, and the like.

Further, the processor 410 can execute application instructions to perform specific applications. For example, the application instructions may include algorithms that can determine coexistence interference based on status changes of wireless devices. In another example, the application instructions may include algorithms that may determine an interference mitigation strategy based on the status changes of the wireless devices.

The non-volatile memory 440 can hold information even when power is off. Therefore, the non-volatile memory 440 can be used to store system and application instructions. More specifically, the non-volatile memory 440 may include instructions of the NRT module, for example as firmware. The instructions of the NRT module can be executed by the processor to perform the functions of the NRT module. It is noted that the non-volatile memory 440 may include various non-volatile memory devices, such as battery backup RAM, read only memory (ROM), programmable ROM (PROM), flash PROM, electrical erasable PROM (EEPROM), magnetic storage, optical storage, and the like.

The RAM 420 is readable and writable. Generally, the RAM 420 can have fast access speed. It can be preferred that data and instructions are stored in the RAM 420 during operation, such that the processor 410 can access the RAM 420 for instructions and data instead of the non-volatile memory 440.

The RT module 470 can include suitable circuits for real-time interference mitigation strategies. For example, the RT module 470 may include application specific integrated circuit (ASIC) that can be configured to perform real-time interference mitigation.

The input interface 415 may provide means for receiving user controlled parameters, and the display interface 430 may provide means for user to monitor the operation of the CCM 400.

The transceiver 460 may include a transmitter portion and a receiver portion. The transmitter portion can be configured to transmit instructions from the CCM 400 to wireless devices. The receiver portion can be configured to receive, for example status changes from the wireless devices to the CCM 400.

It is noted that a wireless device may be in a different platform as the CCM 400. The wireless device may inform a status change over a wireless interface to the CCM 400. The transceiver 460 may received the status change, and may transmit an instruction to adjust a transmission parameter of the wireless device.

It is also noted that a wireless device may be in the same platform as the CCM 400. The wireless device may be coupled to the CCM 400, for example by bus 405. Thus, the wireless device may inform a status change to the CCM 400 via the bus 405, and may receive instructions from the CCM 400 via the bus 405.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A device for managing wireless communication, comprising:
an interface module coupled to at least a first wireless device, wherein the first wireless device communicates with a second wireless device using a first radio frequency (RF) signal that potentially interferes at least a second RF signal communicating between a third wireless device and a fourth wireless device; and
a coexistence communication manager (CCM) interfaced with multiple wireless devices and configured to determine an interference mitigation strategy based in part on a status profile of the first wireless device when the first RF signal interferes with the second RF signal and instruct the first wireless device to change the first RF signal according to the determined interference mitigation strategy; and
a non-real time module configured to execute the interference mitigation strategy when a type of interference is determined to be a non-real time strategy type, and to communicate the interference mitigation strategy to a real-time module configured to execute the interference mitigation strategy when the type of interference is a real-time strategy type.

2. The device of claim 1, wherein the CCM further comprises:
the non-real-time module configured to instruct the first wireless device to change at least one of a transmit power, a channel, a frequency, an orthogonal frequency division multiple access (OFDMA) time-frequency allocation, a code division multiple access (CDMA) code, a frequency hop (FH) code, a symbol rate, an RF signal phase, and an RF polarization in a non-real-time manner.

3. The device of claim 2, wherein the non-real-time module is implemented as firmware.

4. The device of claim 1, wherein the CCM further comprises:
the real-time module configured to arbitrate at least the first wireless device in real time so that the first RF signal is transmitted at a different time than the second RF signal.

5. The device of claim 4, wherein the real-time module is implemented as hardware.

6. The device of claim 1, wherein the interface module comprises a wired interface coupled to the first wireless device.

7. The device of claim 1, wherein the interface module comprises a transceiver providing a wireless interface to at least the first wireless device.

8. The device of claim 1, wherein the interface module is coupled to at least one of the third wireless device and the fourth wireless device.

9. The device of claim 1, wherein the first through fourth wireless devices are located on different platforms.

10. The device of claim 1, wherein the CCM is located on a platform with at least one of the first through fourth wireless devices.

11. The device of claim 1, wherein the CCM is further configured to determine the interference mitigation strategy 12. The device of claim 1, wherein the CCM is configured to receive the status profiles of at least the first wireless device and at least one of the third and fourth wireless devices and determine the interference mitigation strategy based on the received status profiles.

13. The device of claim 1, wherein the CCM is configured to determine the interference mitigation strategy based on the status profiles that are detected by scanning RF environment.

14. The device of claim 1, wherein the CCM is informed of the determined interference mitigation strategy from another module.

15. The device of claim 1, wherein the first wireless device is at least one of a cell phone device, a WiFi device and a Bluetooth device.

16. A platform comprising the device of claim 1.

17. A method for managing coexistence communication, comprising:
  receiving communications from multiple wireless devices by a coexistence communication manager (CCM) interfaced with the multiple wireless devices;
  determining an interference mitigation strategy based on status profiles of at least a first wireless device, wherein the first wireless device communicates with a second wireless device using a first radio frequency (RF) signal that potentially interferes with at least a second RF signal communicating between a third wireless device and a fourth wireless device;
  instructing at least one of the first wireless device and the second wireless device according to the interference mitigation strategy to change at least the first RF signal in order to mitigate the interference of the first RF signal and the second RF signal;
  executing the interference mitigation strategy by a non-real time module when a type of interference is determined to be a non-real time strategy type and
  communicating the interference mitigation strategy to a real-time module configured to execute the interference mitigation strategy when the type of interference is determined to be a real-time strategy type.

18. The method of claim 17, wherein determining the interference mitigation strategy further comprises:
  receiving at least one status profile over a wired interface.

19. The method of claim 17, wherein determining the interference mitigation strategy further comprises:
  receiving at least one status profile over a wireless interface.

20. The method of claim 17, wherein determining the interference mitigation strategy further comprises:
  referring to a look-up-table that stores prior known interference mitigation strategies corresponding to prior known coexistence interference combinations.

21. The method of claim 17, wherein determining the interference mitigation strategy comprises determining a strategy that maximizes a user experience metric for a user using several wireless devices concurrently.

22. The method of claim 17, wherein determining the interference mitigation strategy further comprises:
  calculating an interference-potential metric based on the status profiles.

23. The method of claim 22, wherein the interference-potential metric is at least one of a signal-to-interference ratio, a channel quality indication, a bit error ratio, and a block error ratio.

24. The method of claim 17, wherein the interference mitigation strategy comprises at least a non-real-time change in at least one of a transmit power, a channel, a frequency, an orthogonal frequency division multiple access (OFDMA) time-frequency allocation, a code division multiple access (CDMA) code, a frequency hop (FH) code, a symbol rate, an RF signal phase, and an RF polarization.

25. The method of claim 17, wherein the interference mitigation strategy comprises a real-time arbitration of at least the first RF signal in order to time-multiplex packet transmissions of the first RF signal and at least the second RF signal.

26. The method of claim 17, wherein determining the interference mitigation strategy further comprises:
  scanning the RF environment; and
  detecting the status profiles of at least the first wireless device based on the scanning results.

27. A wireless device, comprising:
  an interface to a coexistence communication manager (CCM) interfaced with multiple wireless devices, the CCM managing signal transmissions in a wireless environment, the interface being configured to provide at least a status profile of its own to the CCM, and receive instructions from the CCM;
  a transceiver configured to transmit a first radio frequency (RF) signal over the wireless environment that transmits at least a second RF signal potentially interfering the first RF signal, wherein the CCM instructs the wireless device to change at least one transmission parameter of the first RF signal according to an interference mitigation strategy determined based in part on the status profile of the wireless device in order to mitigate coexistence interference of the first RF signal and at least the second RF signal; and
  a non-real time module configured to execute the interference mitigation strategy when a type of interference is determined to be a non-real time strategy type, and to communicate the interference mitigation strategy to a real-time module configured to execute the interference mitigation strategy when the type of interference is a real-time strategy type.

28. The wireless device of claim 27, wherein the CCM is configured to instruct the wireless device to change at least one of a transmit power, a channel allocation, a frequency, an orthogonal frequency division multiple access (OFDMA) time-frequency allocation, a code division multiple access (CDMA) code, a frequency hop (FH) code, a symbol rate, an RF signal phase, and an RF polarization in a non-real-time manner.

29. The wireless device of claim 27, wherein the CCM is configured to instruct the wireless device to change a packet transfer time in a real-time manner.

30. The wireless device of claim 27, wherein the interface comprises a wired interface coupled to the CCM.

31. The wireless device of claim 27, wherein the interface comprises a wireless interface communicating with the CCM.

32. The wireless device of claim 27, wherein the wireless device is located in a same platform as the CCM.

33. The wireless device of claim 27, wherein the wireless device is located in a different platform from the CCM.

34. The wireless device of claim 27, wherein the wireless device is at least one of a cell phone device, a WiFi device, and a Bluetooth device.

35. The wireless device of claim 27, wherein the interference mitigation strategy maximizes a user experience metric for a user using several wireless devices concurrently.

* * * * *